(12) United States Patent
Gao et al.

(10) Patent No.: US 12,352,899 B2
(45) Date of Patent: *Jul. 8, 2025

(54) SCANNER CONTROL FOR LIDAR SYSTEMS

(71) Applicant: Hesai Technology Co., Ltd., Shanghai (CN)

(72) Inventors: Yongfeng Gao, Shanghai (CN);
Shengping Mao, Shanghai (CN);
Liangchen Ye, Shanghai (CN);
Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,110

(22) Filed: Apr. 29, 2024

(65) Prior Publication Data

US 2024/0377513 A1    Nov. 14, 2024

Related U.S. Application Data

(63) Continuation of application No. 18/138,869, filed on Apr. 25, 2023, now Pat. No. 12,007,508, which is a
(Continued)

(51) Int. Cl.
*G02B 26/08* (2006.01)
*G01S 7/481* (2006.01)
(Continued)

(52) U.S. Cl.
CPC ............ *G01S 7/4817* (2013.01); *G01S 7/484* (2013.01); *G01S 17/10* (2013.01); *G02B 26/0816* (2013.01); *G02B 26/101* (2013.01)

(58) Field of Classification Search
CPC ........ G01S 7/4817; G01S 7/484; G01S 17/10; G01S 17/894; G01S 17/931;
(Continued)

(56) References Cited

U.S. PATENT DOCUMENTS 7,515,329 B2  4/2009  Sprague et al.
8,111,336 B2  2/2012  Freeman et al.
(Continued)

FOREIGN PATENT DOCUMENTS

CN  101750608 A   6/2010
CN  102150070 B  10/2013
(Continued)

OTHER PUBLICATIONS

PCT/CN2019/085716 International Search Report dated Feb. 13, 2020.
(Continued)

*Primary Examiner* — Euncha P Cherry
(74) *Attorney, Agent, or Firm* — WILSON SONSINI GOODRICH & ROSATI

(57) ABSTRACT

A scanner and a method for controlling the scanner for a Lidar system are provided. The method comprises: producing a trigger signal by a positional sensor of the scanner; generating a single drive signal comprising a first component at a first frequency and a second component at a second frequency, the first component and the second component are superposed with a fixed phase relationship with aid of the trigger signal; transmitting the single drive signal to the scanner, and the scanner has resonant responses at the first frequency; and actuating the scanner to move in a first periodic motion at the first frequency about a first axis, and move in a second periodic motion at the second frequency about a second axis.

18 Claims, 13 Drawing Sheets

Related U.S. Application Data continuation of application No. 16/738,242, filed on Jan. 9, 2020, now Pat. No. 11,668,802, which is a continuation of application No. 16/444,990, filed on Jun. 18, 2019, now Pat. No. 10,571,552, which is a continuation of application No. PCT/CN2019/085716, filed on Jun. 5, 2019.

(51) Int. Cl.
  *G01S 7/484* (2006.01)
  *G01S 17/10* (2020.01)
  *G02B 26/10* (2006.01)

(58) Field of Classification Search
  CPC .............. G02B 26/0816; G02B 26/101; G02B 26/0833; G02B 26/105
  See application file for complete search history.

(56) References Cited

U.S. PATENT DOCUMENTS

| | | |
|---|---|---|
| 9,869,754 B1 | 1/2018 | Campbell et al. |
| 10,571,552 B1 | 2/2020 | Gao et al. |
| 11,668,802 B2 * | 6/2023 | Gao ..................... G01S 17/894 359/214.1 |
| 12,007,508 B2 | 6/2024 | Gao et al. |
| 2005/0253055 A1 | 11/2005 | Sprague et al. |
| 2008/0285103 A1 | 11/2008 | Mizumoto |
| 2011/0013097 A1 | 1/2011 | Freeman et al. |
| 2013/0120819 A1 | 5/2013 | Rothaar et al. |
| 2018/0113200 A1 * | 4/2018 | Steinberg ........... G02B 26/0858 |

FOREIGN PATENT DOCUMENTS

| | | |
|---|---|---|
| CN | 107219532 A | 9/2017 |
| CN | 109116367 A | 1/2019 |
| CN | 109219761 A | 1/2019 |
| WO | WO-2020223877 | 11/2020 |

OTHER PUBLICATIONS

U.S. Appl. No. 16/444,990 Notice of Allowance dated Dec. 11, 2019.
U.S. Appl. No. 16/738,242 Notice of Allowance dated Jan. 31, 2023.
U.S. Appl. No. 16/738,242 Office Action dated Aug. 30, 2022.
U.S. Appl. No. 18/138,869 Notice of Allowance dated Feb. 5, 2024.

* cited by examiner

SCANNER CONTROL FOR LIDAR SYSTEMS

CROSS-REFERENCE

This application is a continuation of U.S. application Ser. No. 18/138,869, filed Apr. 25, 2023, which is a continuation of U.S. application Ser. No. 16/738,242, filed Jan. 9, 2020, now U.S. Pat. No. 11,668,802, issued Jun. 6, 2023, which is a continuation of U.S. application Ser. No. 16/444,990, filed Jun. 18, 2019, now U.S. Pat. No. 10,571,552, issued Feb. 25, 2020, which is a continuation of International Application PCT/CN2019/085716, filed May 6, 2019; each of which is incorporated herein by reference in its entirety.

BACKGROUND OF THE INVENTION

Lidar (light detection and ranging) technology can be used to obtain three-dimensional information of an environment by measuring distances to objects. A Lidar system may include at least a light source configured to emit a light pulse and at least a detector configured to receive a returned light pulse. The returned light pulse or light beam may be referred to as echo light beam. Based on the lapse time between the emission of the light pulse and detection of the returned light pulse (i.e., time of flight), a distance can be obtained. The light pulse can be generated by a laser emitter then shaped (collimated or focused) through a lens or lens assembly. The returned light pulse may be received by a detector located near the laser emitter. The returned light pulse may be scattered light from the surface of an object.

In some situations, multiple light pulses or sequence of light pulses may be emitted into an environment for scanning across a large area. In some cases, a Lidar system may utilize a scanner to steer one or more light beams in one or more directions following a scanning pattern. It is important to provide an improved scanner control for a Lidar system thereby improving the efficiency of sampling the environment or providing adaptive scanning patterns.

SUMMARY OF THE INVENTION

A need exists for improved Lidar system for three-dimensional measurement. A further need exists for a Lidar system with fine grained controllable scanning pattern. In some cases, a Lidar system may utilize a scanner to steer one or more light beams into one or more directions that may require the movement of the scanner to be controlled by an improved control system. In some cases, in order to achieve a desired scanning pattern, movement of the scanner may be controlled at a fine-grained level. The provided Lidar system may address the above needs by providing an improved scanner that is configured to direct light pulses following a configurable scanning pattern. In some cases, in order to achieve a desired scanning pattern, systems or methods of the present disclosure provide mechanisms for controlling the scanner thereby improving the efficiency of sampling the environment and allowing for automatic adaptation to various real-time conditions. In particular, the scanning pattern/path and/or measurement resolution may be adaptive to real-time conditions (e.g., environment conditions). The provided Lidar system may be capable of dynamically adjusting the resolution of sampling points emitted into selected region in 3D space, and the x and/or y resolution of pixels in selected region in a 3D point cloud image. The provided method and apparatus can be used in combination with light source control such that light beams may be emitted into space in accordance with the movement of the scanner. By integrating the control of both the scanner and the light sources, pixel (points) distribution or resolution in selected regions of an image frame can be dynamically controlled in both x and y directions. Moreover, the provided mechanism may allow for Lidar images or point cloud images stabilized across image frames.

In one aspect of the invention, a method is provided for controlling a scanner of a Lidar system. The method may comprise: producing a trigger signal by a positional sensor of the scanner; generating a single drive signal comprising a first component at a first frequency and a second component at a second frequency, further the first component and the second component are superposed with a fixed phase relationship with aid of the trigger signal; transmitting the single drive signal to the scanner, and the scanner has resonant responses at the first frequency; and actuating the scanner to move in a first periodic motion at the first frequency about a first axis, and move in a second periodic motion at the second frequency about a second axis.

In some embodiments, the scanner includes a single multi-axis mirror. In some embodiments, the first periodic motion is at a first resonant frequency of the scanner about the first axis. In some embodiments, the second periodic motion is at a second resonant frequency of the scanner about the second axis. In some embodiments, the second component comprises a ramp waveform. In some cases, the second component comprises a low frequency waveform component and a high frequency waveform component. In some examples, the high frequency waveform component is at a frequency twice that of the first frequency of the first component and the high frequency waveform component and the low frequency waveform component are synchronized with aid of the trigger signal. Alternatively, the high frequency waveform component has variable amplitude and the high frequency waveform component and the low frequency waveform component are combined with a predetermined phase relationship. In some cases, the high frequency waveform component is generated in response to real-time conditions. Such real-time conditions may include detection of a target.

In some embodiments, the trigger signal is generated at the start or end of a sweep cycle of the first periodic motion. In some embodiments, the second component is generated in response to receiving the trigger signal. In some embodiments, the positional sensor is an optic position sensor or positional sensitive detector.

In some embodiments, the scanner is directing a sequence of light pulses along a scanning pattern that approximates a raster scan pattern. In some cases, the method may further comprise dynamically adjusting the scanning pattern along the second axis direction according to real-time conditions. For instance, adjusting the scanning pattern along the second axis direction comprises varying the second periodic motion by superposing a high frequency waveform component to the single drive signal. In such instance, an amplitude or frequency of the high frequency waveform component is determined based on the real-time conditions. In some cases, the method may further comprise dynamically adjusting the scanning pattern along the first axis direction according to real-time conditions. For instance, adjusting the scanning pattern along the first axis direction comprises varying time intervals of emitting the sequence of light pulses.

Another aspect of the present disclosure provides scanner for a Lidar system. The scanner may comprise: a scanner actuated to move in a first periodic motion at a first frequency about a first axis, and move in a second periodic motion at a second frequency about a second axis; a positional sensor configured to generate a trigger signal; and a controller configured to generate a single drive signal to actuate the scanner, and the single drive signal comprises a first component at the first frequency and a second component at the second frequency, further the first component and the second component are superposed with a fixed phase relationship with aid of the trigger signal.

In some embodiments, the scanner comprises a single multi-axis mirror. In some cases, the single multi-axis mirror comprises a scan plate suspended from a gimbal via one or more torsion arms. For example, the one or more torsion arms are in an H shape.

In some embodiments, the first periodic motion is at a first resonant frequency of the scanner about the first axis. In some embodiments, the second periodic motion is at a second resonant frequency of the scanner about the second axis. In some embodiments, the second component comprises a ramp waveform. In some cases, the second component comprises a low frequency waveform component and a high frequency waveform component. For instance, the high frequency waveform component is at a frequency twice that of the first frequency of the first component and in some situations, the high frequency waveform component and the low frequency waveform component are synchronized with aid of the trigger signal. In some cases, the high frequency waveform component has variable amplitude. For instance, the high frequency waveform component and the low frequency waveform component are combined with a fixed phase relationship or the high frequency waveform component is generated in response to real-time conditions. For example, the real-time conditions may include detection of a target.

In some embodiments, the positional sensor is an optic position sensor or positional sensitive detector. In some embodiments, the positional sensor is for detecting a motion of the scanner. In some embodiments, the trigger signal is generated at the start or end of a sweep cycle of the first periodic motion. In some embodiments, the controller is configured to generate the second component in response to receiving the trigger signal. In some embodiments, the scanner is directing a sequence of light pulses along a scanning pattern that approximates a raster scan pattern. In some cases, the scanning pattern is dynamically adjusted along the second axis direction according to real-time conditions. In some situations, the scanning pattern is adjusted by superposing a high frequency waveform component to the single drive signal to vary the second periodic motion. For instance, an amplitude or frequency of the high frequency waveform component is determined based on the real-time conditions. In an example, the real-time conditions include detection of a target.

In some embodiments, the positional sensor is an optic position sensor or positional sensitive detector. In some embodiments, the positional sensor is for detecting a motion of the scanner. In some embodiments, the trigger signal is generated at the start or end of a sweep cycle of the first periodic motion. In some embodiments, the controller is configured to generate the second component in response to receiving the trigger signal.

In some embodiments, the scanner is directing a sequence of light pulses along a scanning pattern that approximates a raster scan pattern. In some cases, the scanning pattern is dynamically adjusted along the second axis direction according to real-time conditions. In some cases, the scanning pattern is adjusted by superposing a high frequency waveform component to the single drive signal to vary the second periodic motion. In some situations, an amplitude or frequency of the high frequency waveform component is determined based on the real-time conditions. In some cases, the scanning pattern is dynamically adjusted along the first axis direction according to real-time conditions. In some situations, the scanning pattern is adjusted by varying time intervals of emitting the sequence of light pulses.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure may be capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
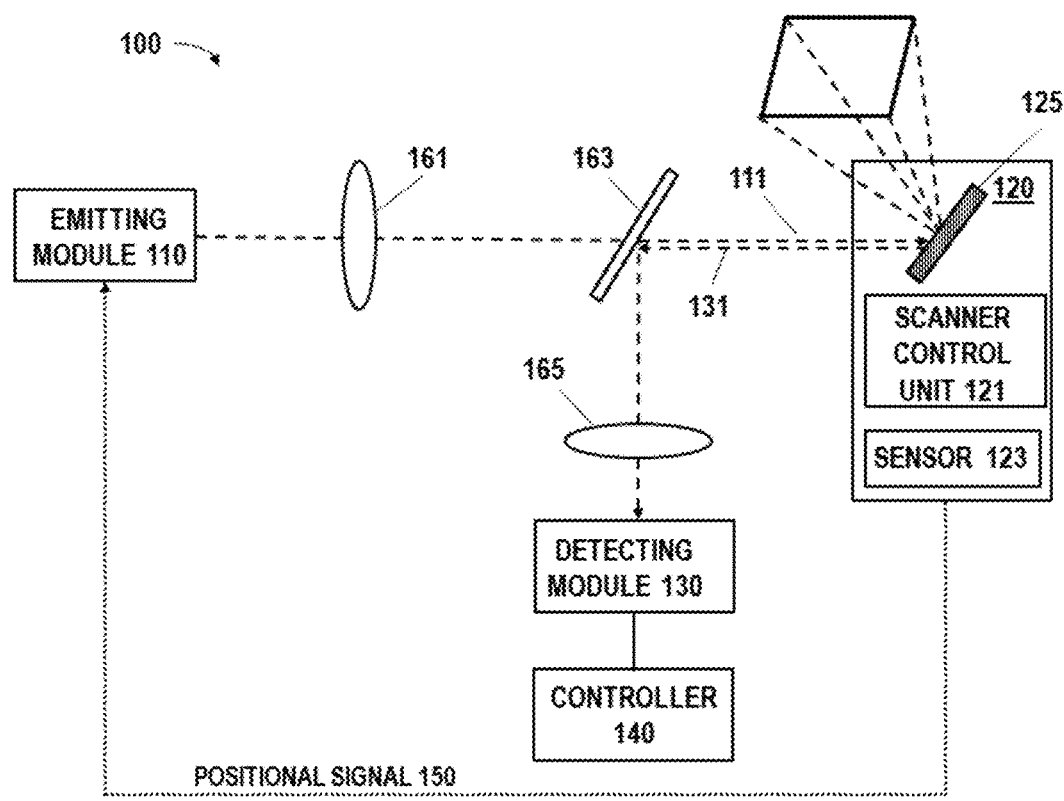
FIG. 1 schematically shows an example of a Lidar system, in accordance with some embodiments of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

A Lidar system may be referred to as a laser ranging system, a laser radar system, a LIDAR system, or a laser detection and ranging (LADAR or ladar) system. Lidar is a type of ranging sensor characterized by long detection distance, high resolution, and low interference by the environment. Lidar has been widely applied in the fields of intelligent robots, unmanned aerial vehicles, autonomous driving or self-driving. The working principle of Lidar is estimating a distance based on a round trip time (e.g., time of flight) of electromagnetic waves between a source and a target.

In some cases, a Lidar system may comprise an emitting apparatus that emits laser pulses into the environment to scan across a space. A sequence of laser pulses may be emitted following a scanning pattern. A scanning pattern (which may be referred to as an optical scanning pattern, optical scan path, or scan path) may refer to a pattern or path along which a laser beam or laser beam spot is directed. Along this scanning pattern, a plurality of laser beam spots may or may not be uniformly distributed. The scanning pattern may be controlled by various factors such as a movement of a scanner or an arrangement of a plurality of light sources.

In some embodiments, the scanner may include one or more scanning mirrors that are configured to rotate, oscillate, tilt, pivot, or move in an angular manner about one or more axes. In some cases, the scanner may be a two-dimensional (2D) scanner. The scanner may use a single scanning mirror that is driven to rotate around both scanning axes. In some cases, the scanning mirror may be driven to perform a fast scan along one axis and a slow scan along the other axis. The two axes may be orthogonal to each other. Conventionally, the fast scan sweeps back and forth horizontally across the field of view (FOV) while the slow scan sweeps back and forth along with vertical direction across the field of view. The fast scan operates at a relatively high scan rate while the slow scan operates at a scan rate equal to the video frame rate. In some cases, the fast scan operates resonantly while the slow scan provides a substantially sawtooth pattern, scanning progressively down the frame for a (large) portion of the frame time and then flying back to the top of the frame to start over or scanning backward from bottom to top in a continuous fashion. In other cases, interleaved sawtooth scanning, triangular wave scanning, sinusoidal scanning and other waveforms may be used to drive one or both axes. A full sweep along the fast axis may be in any range such as over a ±60° angular range, ±50°, ±40°, ±30°, ±20°, ±10° or any value in between. A full sweep along the slow axis may be in any range such as over a ±60° angular range, ±50°, ±40°, ±30°, ±20°, ±10° or any value in between.

The single scanning mirror may be controlled to follow a scan path that substantially covers the field of view (FOV). As an example, the scan path may result in a point cloud with pixels that substantially cover the FOV. The pixels may be distributed across the FOV according to the scanning pattern. In some cases, by controlling the movement of the scanning mirror, the pixels may have a particular non-uniform distribution (e.g., the pixels may have a higher density in one or more selected regions of the FOV). Alternatively or in addition to, by controlling the movement of the scanning mirror, the pixels may be evenly distributed along the scanning pattern.

In some cases, a pixel or measurement point may correspond to a light pulse. In alternative cases, a pixel or measurement point may correspond to multiple light pulses. A pixel or measurement point may be a distance measurement point. In some cases, a distance measurement point may be generated using a single light pulse. In some cases, a measurement point may be obtained by emitting a sequence of encoded light pulses emitted within short time duration such that the sequence of light pulses may be used to derive a distance measurement point. For example, Lidar can be used for three-dimensional (3D) imaging (e.g., 3D point cloud) or detecting obstacles. In such cases, a distance measurement associated with a sequence of light pulses can be considered as a pixel, and a collection of pixels emitted and captured in succession (i.e., "point cloud") can be rendered as an image or analyzed for other reasons (e.g., detecting obstacles). A sequence of light pulses may be generated and emitted within a duration of, for example, at least 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 μs, 2 μs, 3 μs, 4 μs, 5 μs, 50 μs, 100 μs, 200 μs, 300 μs, 400 μs, 500 μs, or more. In some cases, the time intervals between consecutive sequences may correspond to the temporal resolution of 3D imaging. The temporal resolution of a point cloud image may also affect the pixel resolution in a horizontal direction or fast scan direction. The time intervals among sequences may be constant or variable.

It should be noted that a fast scan direction does not need to be aligned with the horizontal direction (rotating about a vertical scan axis) and a slow scan direction does not to be aligned with the vertical direction (rotating about a horizontal scan axis). The fast scan direction and/or slow scan direction can be in any orientation with respect to the ground reference frame.

As utilized herein, terms "sequence of light pulses", "sequence of pulses", "sequence of signals" and the like are used interchangeably throughout the specification unless context suggests otherwise. Terms "measurement signals", "measurement pulses", "signal lights", "output beams" and the like may refer to light pulses emitted from the emitting apparatus of the Lidar system unless context suggests otherwise. Terms "echo beams", "return signals", "return pulses" and the like may refer to light pulses received by the detector of the Lidar system and are used interchangeably throughout the specification unless context suggests otherwise.

The output beam or signal light may then be directed into a space for measurements. As an example, output beam may have an average power of approximately 1 mW, 10 mW, 100 mW, 1 W, 10 W, or any other suitable average power. As another example, output beam may include pulses with a pulse energy of approximately 0.1µJ, 1µJ, 10µJ, 100µJ, 1 mJ, or any other suitable pulse energy. As another example, output beam may include pulses with a peak power of approximately 10 W, 100 W, 1 KW, 2 KW, 5 KW, 10 KW, or any other suitable peak power. An optical pulse with a duration of 400 ps and a pulse energy of 1µ has a peak power of approximately 2.5 kW. If the pulse repetition frequency is 500 kHz, then the average power of an output beam with 1 µJ pulses is approximately 0.5 W. In some cases, the wavelength of the output beam may be in the range of 900 nm to 1600 nm or in any other suitable range. In some cases, the wavelength of the output beam may be in the range of 1530 nm to 1570 nm to provide eye-safe laser.

FIG. 1 schematically shows an example of a Lidar system 100. In some embodiments, a Lidar system 100 may comprise an emitting module 110, a receiving module, a scanner 120, and a plurality of optical components such as lens assembly 161, 165, mirror 163.

The emitting module 110 may comprise at least one light source configured to generate laser beams or pulses of light. The wavelength of the laser beam may be in any suitable range depending on the specific application. In some cases, the light source may include eye-safe laser. An eye-safe laser may refer to a laser with an emission wavelength, average power, peak power, peak intensity, pulse energy, beam size, beam divergence, or exposure time such that emitted light from the laser presents little or no possibility of causing damage to a person's eyes. As an example, light source may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In some embodiments, the light source may include an eye-safe laser (e.g., a Class 1 or a Class I laser) configured to operate at any suitable wavelength between approximately 1400 nm and approximately 2100 nm. In some cases, a light source may include an eye-safe laser with an operating wavelength between approximately 1400 nm and approximately 1600 nm. In some cases, a light source may include an eye-safe laser with an operating wavelength between approximately 1530 nm and approximately 1560 nm.

The light source may include a laser diode. The light source may include any suitable type of lasers, such as for example, a Fabry-Perot laser diode, a quantum well laser, a distributed Bragg reflector (DBR) laser, a distributed feedback (DFB) laser, or a vertical-cavity surface-emitting laser (VCSEL). In some cases, the light source may include a fiber-laser module. In an example, the fiber-laser module may include a current-modulated laser diode with a peak wavelength of approximately 1550 nm followed by a single-stage or a multi-stage erbium-doped fiber amplifier (EDFA). The fiber-laser module may include a seed laser, a pump laser, an optical amplifier (e.g., gain fiber or fiber amplifier) and other components.

The output beam or signal light may be directed to one or more optical elements (e.g., reflectors) and/or pass through a lens assembly 161 (e.g., collimation lens, collimation lens assembly) for collimating or focusing light beams 111. The Lidar system 100 can include any suitable optical components such as one or more lenses, mirrors, filters (e.g., bandpass or interference filters), beam splitters, polarizers, polarizing beam splitters, wave plates (e.g., half-wave or quarter-wave plates), diffractive elements, or holographic elements, telescope, to expand, focus, or collimate the output beam 111 to a desired beam diameter or divergence.

Similarly, the returned light beams 131 may pass through one or more optical components 165 so that the returned light beams can be directed, focused onto an active region of a detector of the detecting module 130. The one or more optical components can include, for example, one or more mirrors (e.g., flat mirror, concave mirror, convex mirror, parabolic mirror) or lens/lens assembly to direct the returned light beams to the detector.

The Lidar system 100 may comprise a mirror 163 configured to allow signal light 111 pass through the mirror meanwhile direct the returned light 131 to the detector. In some cases, the mirror 163 may include a hole, slot, or aperture which allows the signal light 111 pass through. In some cases, the mirror 163 may be configured so that at least a fraction (e.g., at least 90%, 80%, 70%, 60%, etc.) of the signal light 111 passes through mirror and at least a fraction (e.g., at least 90%, 80%, 70%, 60%, etc) of the returned light beams 131 is reflected by mirror 163. In some cases, the mirror 163 may provide for signal light 111 and returned light beam 131 to be substantially coaxial so that the two beams travel along substantially the same optical path but in opposite directions. For example, the mirror 163 may include a hole, slot, or aperture which the signal light 111 passes through and a reflecting surface that reflects at least a portion of the returned light beam 131 toward an active region of the detector 130.

The detecting module 130 may comprise one or more detectors configured to receive the echo beams 160. A detector may be a photoreceiver, optical receiver, optical sensor, photodetector, or optical detector. In some cases, a detecting module may include one or more avalanche photodiodes (APDs) or one or more single-photon avalanche diodes (SPADs). In some cases, a receiving module may include one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions).

The returned light beam may be directed to an active region of the detector. The active region may have any suitable size or diameter, such as for example, a diameter of approximately 25 µm, 50 µm, 80 µm, 100 µm, 200 µm, 500 µm, 1 mm, 2 mm, or 5 mm. In some cases, the mirror 163 may have a reflecting surface that is substantially flat or the reflecting surface may be curved (e.g., mirror may be an off-axis parabolic mirror configured to focus the input beam 131 onto an active region of the receiver). A reflecting surface of the mirror 163 may include a reflective metallic coating (e.g., gold, silver, or aluminum) or a reflective dielectric coating, and the reflecting surface may have any suitable reflectivity R at an operating wavelength of the light source (e.g., R greater than or equal to 70%, 80%, 90%, 95%, 98%, or 99%).

In some embodiments, the Lidar system 100 may comprise an optical receiving device 165 (e.g., focusing lens, focusing lens assembly), one or more optical elements (e.g., reflectors) 163 that allow for the reflected light off an external object pass through the optical receiving device and then is received by the detecting module 130. The received optical signals may be converted to electrical signals and processed by the controller 140.

The Lidar system 100 may include a scanner 120 to steer the output beam 111 in one or more directions. The scanner 120 may be configured to scan the output beam 111 over an angular range. In some cases, the scanner 120 may be configured to scan the output beam 111 over a 5-degree angular range, 20-degree angular range, 30-degree angular range, 60-degree angular range, or any other suitable angular range. As an example, a scanning mirror may be configured to periodically oscillate or rotate back and forth over a 15-degree range, which results in the output beam 111 scanning across a 30-degree range (e.g., a Θ-degree rotation by a scanning mirror results in a 2Θ-degree angular scan of output beam). In some embodiments, a field of regard (FOR) of a Lidar system 100 may refer to an area, region, or angular range over which the Lidar system may be configured to scan or capture distance information. As an example, a Lidar system with an output beam 111 with a 30-degree scanning range may be referred to as having a 30-degree angular field of regard. As another example, a Lidar system 100 with a scanning mirror that rotates over a 30-degree range may produce an output beam 111 that scans across a 60-degree range (e.g., a 60-degree FOR). In particular embodiments, Lidar system 100 may have a FOR of approximately 10°, 20°, 40°, 60°, 120°, or any other suitable FOR. In some cases, a FOR may be referred to as a full scan region.

In some embodiments, the scanner 120 may include one or more scanning mirrors that are configured to rotate, oscillate, tilt, pivot, or move in an angular manner about one or more axes. In some cases, a flat scanning mirror 125 may be attached to a scanner actuator or mechanism which actuates the mirror to scan over a particular angular range. In some cases, the scanner 120 may include a resonant scanning mirror or oscillation mirror 125. In some cases, the scanner may be a two-dimensional (2D) scanner. The scanner may use a single scanning mirror that is driven to rotate around both scanning axes. In some cases, the scanning mirror may be driven to perform a fast scan along one axis and a slow scan along the other axis. The two axes may be orthogonal to each other. The scanning mirror 125 may be designed such that single scanning mirror has resonant responses at one or more frequencies of the drive signal to produce a desired periodic movement. For example, the resonant frequency and amplification factor of the scanning mirror may be selected independently in each of two axes by distributing its mass differently about each of the axes and by designing the supporting structures (e.g., support arms or torsional arm that have different torsional stiffness in each axis). Details about the design of the scanning mirror and drive signals are described later herein.

The scanner can be actuated by any suitable actuator or mechanism such as galvanometer scanner, a piezoelectric actuator, a polygonal scanner, a rotating-prism scanner, a voice coil motor, an electric motor (e.g., a DC motor, a brushless DC motor, a synchronous electric motor, or a stepper motor), or a microelectromechanical systems (MEMS) device and the like.

A resonant scanner (which may be referred to as a resonant actuator) may include a spring-like mechanism driven by an actuator to produce a periodic oscillation at a substantially fixed frequency. The periodic oscillation frequency associated with the fast scanning axis may be the same as the resonant frequency about the fast scanning axis. The periodic oscillation frequency at which the scanning mirror is rotated about the slow scanning axis may be the resonant frequency about the slow scanning axis or an off resonance frequency component. The oscillation frequency about the fast scanning axis may be about 1 kHz. The fast scanning oscillation frequency can be any value below 1 kHz or above 1 kHz. The slow scanning oscillation frequency can be any value in the range of about 10 Hz to 100 Hz. The slow scanning oscillation frequency can be any value below 10 Hz or above 100 Hz. In some cases, the fast scanning oscillation frequency and the slow scanning oscillation frequency may have a pre-determined relationship. For example, the fast scanning oscillation frequency can be at least about 4, 5, 6, 7, 8, 9, 10, 11, 12, 13, 14, 15, 16, 17, 18, 19, 20, 30, 40, 50, 60, 70, 80, 90, or 100 times of slow scanning oscillation frequency.

The scanner 120 may include a scanning mirror 125 that can have any suitable geometry or dimension such that the scanning mirror may oscillate at a resonant frequency about one or more axes in response to a drive signal. In some cases, the scanning mirror may include a scan plate having a diameter or width between approximately 3 mm and 15 mm. In some cases, the scanning mirror may also receive returned light beams 131 and direct the returned light beams to the mirror 163.

The scanning mirror can be rotated by any suitable actuation mechanism such as rotated using electromagnetic actuation. In an example, a scanning mirror may be actuated by a voice coil motor (which may be referred to as a voice coil actuator) which may include a magnet and coil. When an electrical current is supplied to the coil, a translational force is applied to the magnet, which causes the scanning mirror attached to the magnet to move or rotate. A galvanometer scanner (which may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror.

In some embodiments, the scanner 120 may include a scanner control unit 121 which may control the scanning mirror(s) so as to guide the output beam 111 in a desired direction or along a desired scanning pattern. The scanner control unit 121 may generate a drive signal to actuate the scanning mirror 125. The drive signal to actuate the scanning mirror may comprise one or more components having different frequencies or one or more individual waveforms. In some cases, the drive signal may be a single drive signal comprising multiple frequency components (e.g., multiplexed frequencies) such that at least one of the frequency components is modulated at the resonant frequency of the fast scan and at least one of the frequency components is for the slow scan. The frequency for the slow scan may or may not be the resonant frequency about the slow scan axis. The signal component for the slow scan can be a superimposed waveform comprising different frequency components. Alternatively, separate drive signals corresponding to the two scanning axes may be supplied to the scanning mirror. Details about the drive signals and waveform (frequency) components are described later herein.

In some cases, the scanner 120 may further include one or more sensors 123 configured to detect the angle position and/or angular motion of the scanning mirror. The positional signal 150 may be transmitted to the scanner control unit 121 for controlling the driving signal of the scanner. In some embodiments, the positional signal 150 may be used to synchronize the oscillation in the two axes thereby stabilizing the point cloud images from frame to frame. For instance, with aid of the positional signal, the zero speed position of a horizontal oscillation cycle is synchronous with the start or end of the vertical oscillation cycle so that the coordinates of pixels (points) across different frames are substantially the same.

Any suitable sensors can be used to detect the motion or angular position of the scanning mirror. For example, piezo-resistive, photodetector, optical position sensor (OPS), position sensitive detector (PSD) or other sensors can be used to sense the motion or positon. In some cases, a PSD may be used to measure the angular position of the scanning mirror. The angular position may be measured with an angular resolution of no more than 0.01 degree, 0.05 degree, 0.1 degree, or any value below 0.01 degree or above 0.1 degree.

In optional embodiments, the positional signal 150 or a sensor signal generated by the position sensor 123 may also be used by the emitting module 110 to coordinate light pulses and the motion of the scanning mirror. This may beneficially allow for adjusting the distribution or resolution of pixels (measurement points) in selected regions both the fast scan and slow scan directions.

Figure 2:
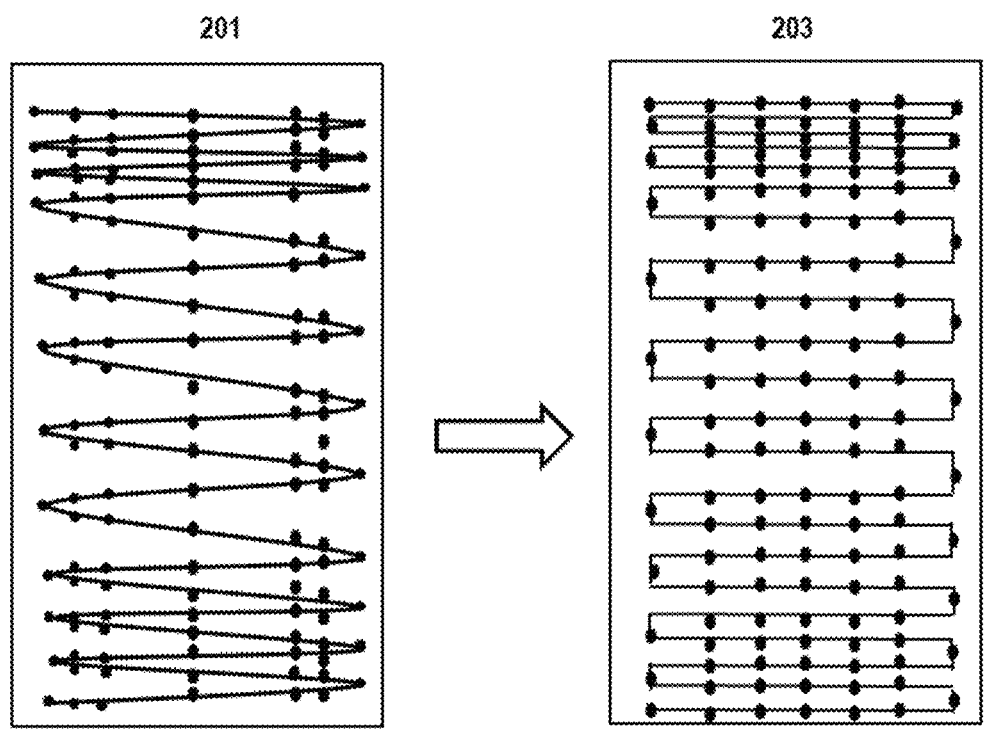
FIG. 2 shows an example of a distorted scanning pattern and a raster scanning pattern.

In the case when a 2D resonant scanner is utilized, the scan speed of a resonant scanner is constantly changing in both horizontal and vertical directions. Like a pendulum, the scanner may be accelerating toward the center and then decelerating toward the end of the sweep. Then it reverses the cycle. This may result in a non-straight horizontal line (i.e., fast scanning lines) and/or undesired pixels distribution in the scanning pattern. FIG. 2 shows an example of a scanning pattern 201 suffer from raster pinch distortion and a raster scanning pattern 203 with the distortion corrected. The scan pattern 201 without the raster pinch correction may be "pinched" at the outer edges of the field of view in the horizontal direction. That is, in successive forward and reverse sweeps of the light pulses, the pixels near the edge of the scan pattern are unevenly spaced. This uneven spacing can cause the pixels to overlap or can leave a gap between adjacent rows of pixels. The distribution of the rows of horizontal lines is also uneven in the vertical direction resulting in sparse pixels towards the center of the field of view and denser pixels towards the top and bottom of the field of view.

The provided scanner or Lidar system may provide improved scanner control so that the measurements points along the scanning pattern can be stabilized across image frames, the scanning pattern may better approximate a raster pattern with a built-in raster pinch correction feature, and/or distribution (resolution) of pixels along the slow scan directions (i.e., cycles of fast scan along slow scanning direction) can be configured and controlled in substantially real-time. As will be described later herein, the scan path followed by the light pulses in response to a ramped vertical scan (exemplified by individual waveforms including a low frequency component and a high frequency component twice that of the fast scan) may approximate a raster scan pattern.

In some embodiments of the invention, a single scanning mirror may be utilized to perform oscillation movement about two or more axes. The scanning mirror may be a resonant mirror with geometrics, mass distribution and structures designed such that the scanning mirror may oscillate at a resonant frequency about one or more axes in response to a drive signal. The two axes may correspond to a fast scan axis and a slow scan axis.

Figure 3:
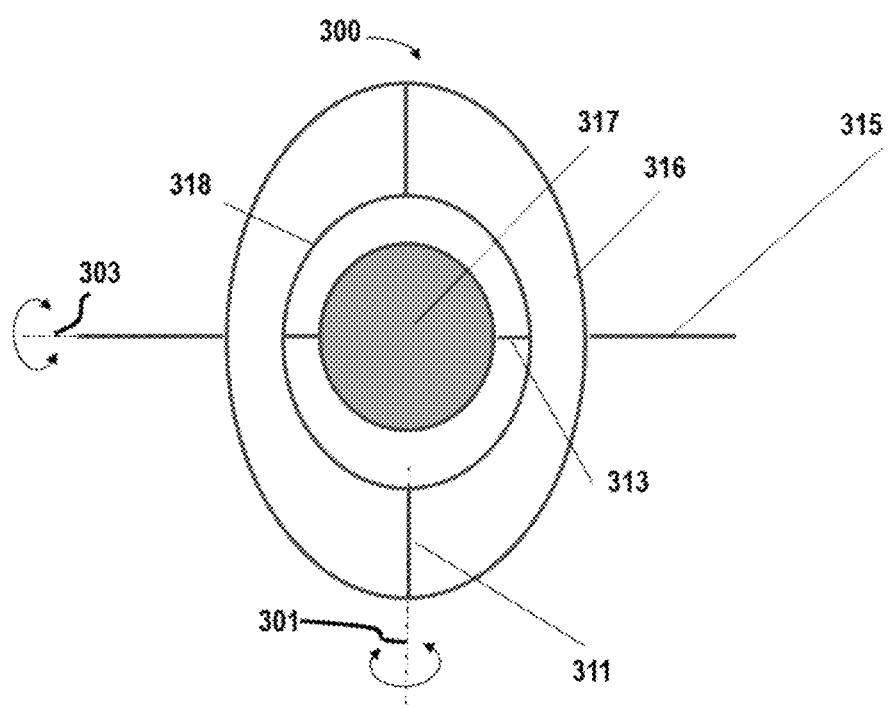
FIG. 3 schematically shows an example of a multi-axis scanning mirror, in accordance with some embodiments of the invention.

FIG. 3 schematically shows an example of a multi-axis scanning mirror 300, in accordance with some embodiments of the invention. The scanning mirror 300 may be actuated to rotate about a fast scan axis 301 and a slow scan axis 303. In the illustrated example, movement about the fast scan axis 301 may result in horizontal scan cycles and movement about the slow scan axis 303 may result in periodic vertical scan.

In some embodiments, the scanning mirror 300 may include a scan plate 317. The scan plate 317 may include a mirror formed thereon or attached thereto. The scan plate 317 may have a diameter or width between approximately 3 mm and 15 mm. The scan plate 317 can have any form factor such as circular, oval, rectangular, square and various others. The movement of the scan plate 317 may be controlled by the system for directing the incident light pulses into desired directions such as following a scan pattern.

The scanning mirror 300 may be coupled to actuators or mounting structures via torsion arms 315. For example, the torsion arms 315 may be mechanically connected to a fixed substrate or mounting structure for receiving drive signals. The torsion arms 315 may be coupled to a gimbal frame 316. The gimbal frame 316 can be in any form factor such as circular, rectangular, oval and the like.

For a given drive frequency, the amplitude of movement of gimbal frame 316 (and other structures suspended therefrom) may be proportional to the voltage of the drive signal and to the mechanical amplification factor of the rotating mass at the drive frequency (although not necessarily linearly proportional). For drive frequency components at or near the resonance frequency of the gimbal frame (and suspended structures), the rotational movement about the slow axis 303 may be amplified. For off resonance drive frequency components, the amplitude of rotation of the gimbal frame is reduced and, at certain frequency ranges, inverted. In some cases, frequency of the drive signal may be selected to not be at the resonant frequency of the slow axis so as to avoid frequency drift during operation. In alternative cases, resonance frequency drive component may be used to drive the oscillation response about the slow scan axis.

An inner gimbal ring 318 may be suspended from the gimbal frame 316 via torsion arms 311 allowing the inner gimbal ring and components carried thereon to rotate about the fast scan axis 301 relative to the gimbal frame 316. The combined mass and distribution of mass of the assembly comprising the scan plate 317, the inner gimbal ring 318, and the stiffness of torsion arms 311 may determine a resonant frequency and amplification factor for the rotation of scan plate 317 about the fast scan axis 301. Any suitable resonant frequency and amplification factor for the fast scan axis or both of the two axes can be selected by varying the mass distribution and mass of the components and/or stiffness of the torsion arms. The oscillation frequency about the fast scanning axis may be the resonant frequency which can be about 1 kHz. The fast scanning oscillation frequency can be any value below 1 kHz or above 1 kHz. The slow scanning oscillation frequency can be any value in the range of about 10 Hz to 100 Hz. The slow scanning oscillation frequency can be any value below 10 Hz or above 100 Hz. In some cases, the fast scanning oscillation frequency and the slow scanning oscillation frequency may have a predetermined relationship. For example, the fast scanning oscillation frequency can be at least about 4, 5, 6, 7, 8, 9, 10, 11, 12, 13, 14, 15, 16, 17, 18, 19, 20, 30, 40, 50, 60, 70, 80, 90, or 100 times of slow scanning oscillation frequency.

In some embodiments, the scan plate 317 may be coupled to an inner gimbal ring 318 via torsion arms 313. The torsion arms may be coupled to two opposing sides of the scan plate 317. As can be seen, the scan plate 317 is suspended from the inner gimbal ring 318 by torsion arms 313 such that the scan plate 317 is allowed to rotate about the slow scan axis 303 relative to the inner gimbal ring 318. Introducing the torsion arms 313 and inner gimbal ring 318 may allow the scan plate 317 to have a secondary mode that is twice of the resonant frequency of the fast scan axis such that the raster pinch distortion can be corrected. For example, in order to correct the raster pinch distortion, the drive signal may be a single composite drive signal that contains the superposition of vertical drive waveform at a slow frequency (e.g., resonant frequency of the slow scan axis) and a vertical drive sawtooth waveform at twice of the resonant frequency of the fast scan axis, the inner gimbal ring 318 may oscillate with a resonant frequency in mode 2 owing to the torsion arms and the inner gimbal ring.

The scanning mirror 300 may comprise or be actuated by an actuator (e.g., coil). The actuator may be driven to produce rotational movement of the gimbal frame 316, the inner gimbal ring 318 and suspended scan plate 317 about axes 301, 303. In some cases, a combined coil may be included to drive the movement of the scanning mirror about the two axes. Alternatively or in addition to, separate coils may be driven to produce rotational movement of the scan plate 317 about the fast scan axis, and rotational movement of the assembly comprising the gimbal frame, the inner gimbal ring and scan plate to rotate about the slow scan axis respectively. When the coil receives a signal that is periodically driven at a rate corresponding to the resonance frequency (or any frequency that produces a suitable response) of the scan plate 317 about the fast scan axis, the amplitude of the rotation of scan plate about the fast scan axis can be enhanced owing to the mechanical amplification factor. In a similar manner, when the coil receives a signal that is periodically driven at a rate corresponding to the resonance frequency of the assembly comprising scan plate, torsion arms, inner gimbal ring and gimbal frame; the assembly may oscillate about the slow scan axis with enhanced amplitude owing to the mechanical amplification factor thereby achieving a greater angle range with relative small amount of input energy. Alternatively, the oscillation frequency associated with the slow scan axis may not be at or near the resonant frequency so as to avoid frequency drift during operation.

Figure 4:
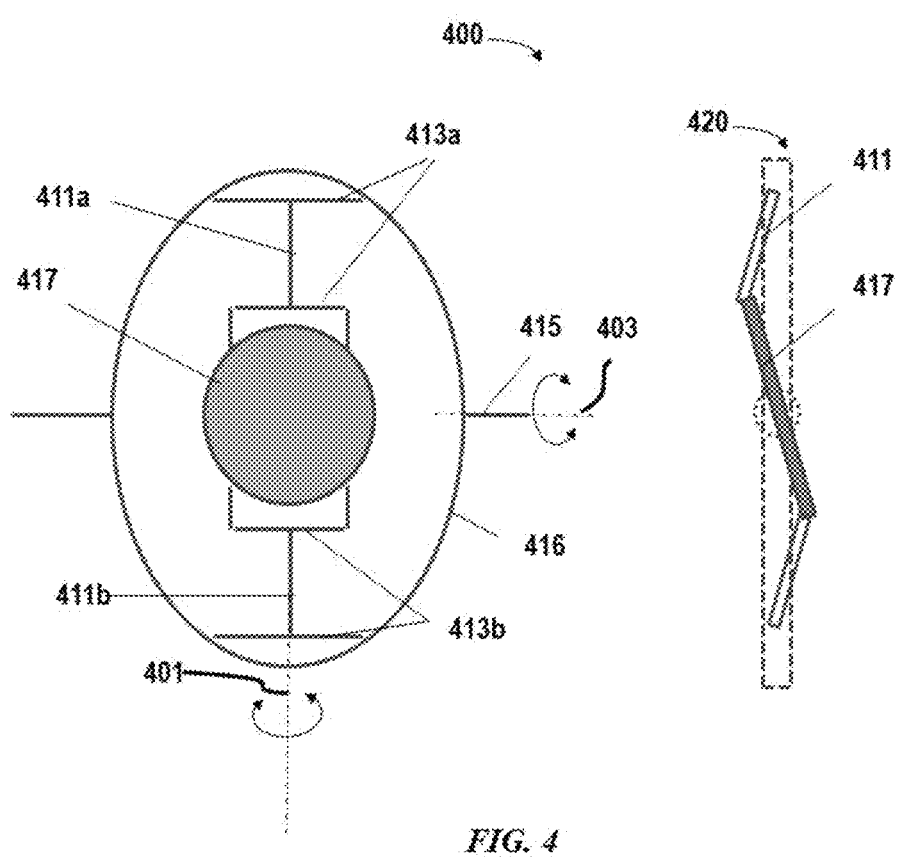
FIG. 4 schematically shows an example of a multi-axis scanning mirror, in accordance with some embodiments of the invention.

FIG. 4 schematically shows another example of multi-axis scanning mirror 400, in accordance with some embodiments of the invention. Similar to the scanning mirror described with respect to FIG. 3, the scanning mirror 400 may be actuated to rotate about a fast scan axis 401 and a slow scan axis 403. In the illustrated example, periodic movement about the fast scan axis 401 may result in horizontal scan cycles and periodic movement about the slow scan axis 403 may result in periodic vertical scans. The scanning mirror 400 may have different structures for providing the high frequency response about the slow scan axis allowing for an overall compact design of the scanning mirror or an increased effective/active region of the scan plate.

The scanning mirror 400 may be coupled to actuators or mounting structures via torsion arms 415 in a similar manner as described in FIG. 3. For example, the torsion arms 415 may be mechanically connected to a fixed substrate or mounting structure for receiving drive signals. The torsion arms 415 may be coupled to a gimbal frame 416 functioning as a support structure for the scan plate. The gimbal frame 416 can be in any form factor such as circular, rectangular, oval, square and the like.

For a given drive frequency, the amplitude of movement of gimbal frame 416 (and other structures suspended therefrom) may be proportional to the voltage of the drive signal and to the mechanical amplification factor of the rotating mass at the drive frequency (although not necessarily linearly proportional). For drive frequency components at or near the resonance frequency of the gimbal frame (and suspended structures), the rotational movement about the slow axis 403 may be amplified. For off resonance drive frequency components, the amplitude of rotation of the gimbal frame is reduced and, at certain frequency ranges, inverted. In some cases, frequency of the drive signal may be selected to an off resonance frequency of the slow scan axis so as to avoid frequency drift during operation. In alternative cases, resonant frequency may be used to drive the movement about the slow scan axis to achieve a greater angle range. For example, the combined mass and distribution of mass of the assembly comprising the scan plate 417, any components disposed between the scan plate and the torsion arms 415, and the stiffness of torsion arms 415 may determine a resonant frequency and amplification factor for the rotation of scan plate 417 about the slow scan axis 403.

The scan plate 417 may be suspended from the gimbal frame 416 via a first pair of torsion arms 413a, 413b, a second pair of torsion arms 411a, 411b, allowing the scan plate 417 to rotate about the fast scan axis 401 and slow scan axis 403 relative to the gimbal frame 416. In the illustrated example, the scan plate 417 may be coupled to the gimbal frame 416 via an H-shaped structure disposed on opposing sides of the scan plate 417. Similar to the example described in FIG. 3, introducing the torsion arms 413a, 413b, may allow the scan plate 417 to have a secondary mode that is twice of the resonant frequency of the fast scan axis such that the raster pinch distortion can be corrected. As illustrated in the side view 420, a vibration response at resonant frequency in mode 2 about the slow scan axis can be achieved. By replacing the inner gimbal ring and torsion arms with the H-shaped torsion arms, a compact design or a scan plate with increased effective area may be provided at little cost of the overall size of the scanning mirror.

The combined mass and distribution of mass of the assembly comprising the scan plate 417, the torsion arms 413a, 413b, and the stiffness of torsion arms 411a, 411b may determine a resonant frequency and amplification factor for the rotation of scan plate 417 about fast scan axis 401. Any suitable resonant frequency and amplification factor for the fast scanning axis or both of the axes can be selected by varying the mass distribution and mass of the components. The oscillation frequency about the fast scanning axis may be the resonant frequency which, in some cases, may be about 1 kHz. The fast scanning oscillation frequency can be any value below 1 kHz or above 1 kHz. The slow scanning oscillation frequency can be any value in the range of about 10 Hz to 100 Hz. The slow scanning oscillation frequency can be any value below 10 Hz or above 100 Hz. In some cases, the fast scanning oscillation frequency and the slow scanning oscillation frequency may have a pre-determined relationship. For example, the fast scanning oscillation frequency can be at least about 4, 5, 6, 7, 8, 9, 10, 11, 12, 13, 14, 15, 16, 17, 18, 19, 20, 30, 40, 50, 60, 70, 80, 90, or 100 times of slow scanning oscillation frequency.

The scanning mirror 400 may comprise or be actuated by an actuator (e.g., coil). The actuator may be driven to produce rotational movement of the gimbal frame 416, the H-shaped torsion structures and suspended scan plate 417 about axes 401, 403. In some cases, a combined coil may be utilized to drive the movement about the two axes. Alternatively or in addition to, separate coils may be driven to produce rotational movement of the scan plate 417 about the fast scan axis, and rotational movement of the assembly comprising the gimbal frame, H-shaped torsion structure and scan plate to rotate about the slow scan axis, respectively. When the coil receives a signal that is periodically driven at a rate corresponding to the resonance frequency (or any frequency that produces a suitable response) of the scan plate 417 about the fast scan axis, the amplitude of the rotation of scan plate about the fast scan axis can be enhanced owing to the mechanical amplification factor. In a similar manner, when the coil receives a signal that is periodically driven at a rate corresponding to the resonance frequency of the assembly comprising scan plate, torsion arms, gimbal frame and any components carried thereon; the assembly may oscillate about the slow scan axis with enhanced amplitude owing to the mechanical amplification factor thereby achieving an increased angle range with relatively small amount of input energy. Alternatively, the oscillation frequency associated with the slow scan axis may not be at or near the resonant frequency so as to avoid frequency drift during operation.

Figure 5:
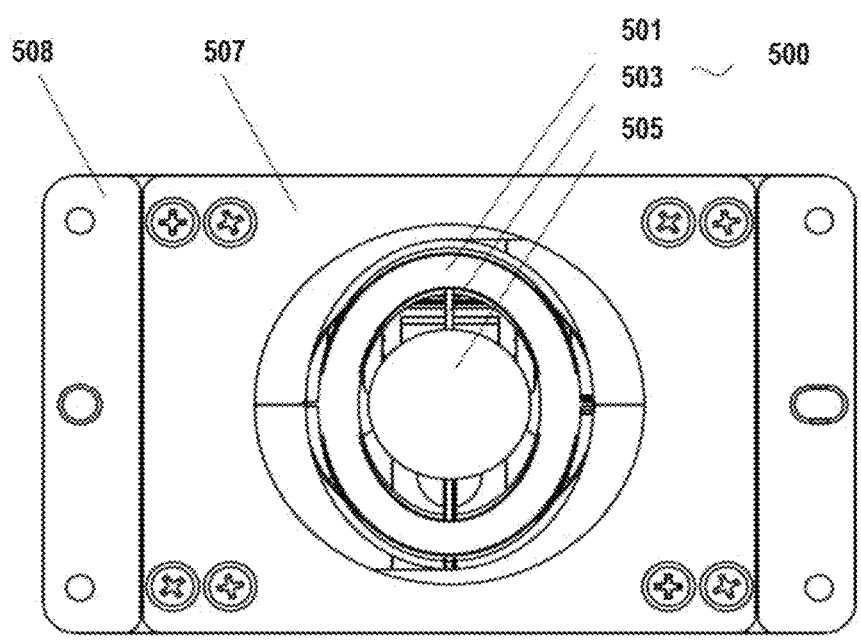
FIG. 5 shows an example assembly of a scanning mirror, in accordance with embodiments of the invention.

FIG. 5 shows an example assembly of a scanning mirror, in accordance with embodiments of the invention. The scanning mirror 500 can be the same scanning mirror as described above. For example, the scanning mirror 500 may comprise a scan plate 505 which is coupled to a gimbal frame 501 via torsion arms 503. The scanning mirror may be attached to or fixed to a substrate or mounting unit via torsion arms as described elsewhere herein. In some cases, the scanning mirror, actuator (not shown) and mounting structures may be enclosed in a case 507, 508. The case may have at least a surface 507 having an opening or aperture such that light pulses may incident on the scanning mirror 500 and be directed to one or more directions.

As mentioned above, in order to correct the raster pinch distortion and/or to stabilize the image frames, the drive signal for the slow scan axis and fast scan axis may be synchronized so that there is a substantially fixed phase difference between their oscillations. In some cases, the oscillation frequency of the fast scan may be n times of the oscillation frequency of the slow scan where n can be in integer such as 2, 3, 4, 5, 6, 7, 8, 10, 15, 20, 25, 30, 25, 40, 45, 50, 60, 70, 80, 90, 100 or more. In some cases, the oscillation movements about the two axes may be synchronous and the phase difference may be zero.

In some embodiments, the synchronization may be achieved with aid of a sensor (e.g., positional sensor 123 in FIG. 1). The sensor can be the positional sensor for controlling the movement of the scanning mirror. Positional signal produced by the positional sensor may be used by the scanner control unit for generating a driving signal of the scanner. For example, scanning movement of the scan plate may be detected by the positional sensor and used for synchronizing or combining multiple components of the drive signals. The positional signal may be generated when the scan plate reaches the ends of a sweep (e.g., start or end). In some cases, when the scan plate reaches the start or end of a horizontal sweep, the positional signal may be generated and used to trigger a cycle of the vertical scan thereby synchronizing the oscillation movement along the two scan axes. The position signal may be generated at the start or end of a horizontal (i.e., fast scan) sweep cycle. In some embodiments, the positional signal may be generated by the same position sensor (e.g., sensor 123) as described in FIG. 1. Alternatively, the positional signal can be generated by any other sensor that is capable of detecting the angular position of the scanner.

Figure 6:
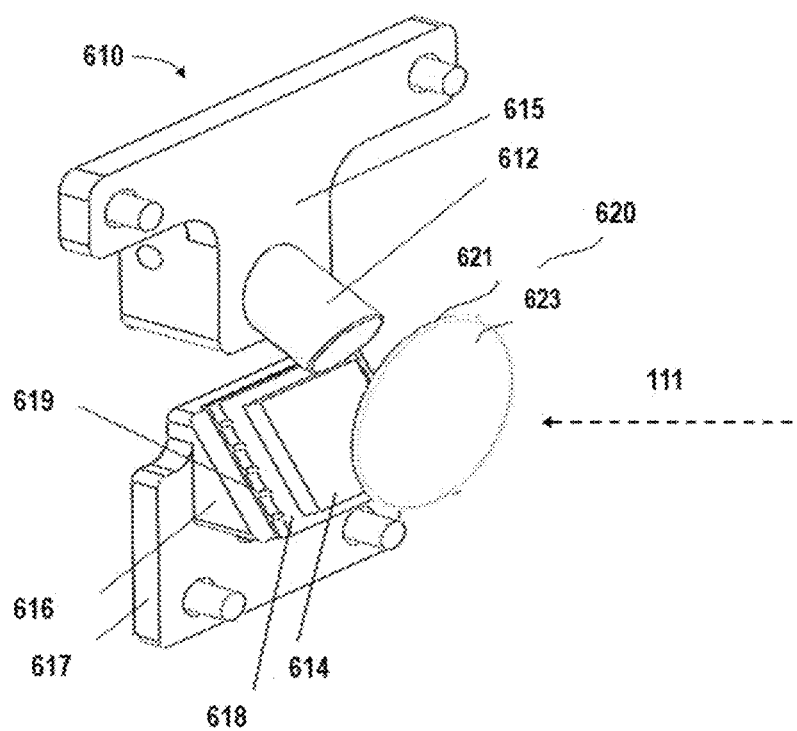
FIG. 6 shows an example of a sensor configured to provide signals for synchronizing or combining drive signal components or individual waveforms.

FIG. 6 shows an example of a sensor 610 configured to provide signals for synchronizing or combining drive signal components or individual waveforms. For example, the sensor signals may be used as trigger signal to synchronize a periodic slow scanning motion with a periodic fast scanning motion. As described above, the sensor 610 may be used to detect the angle position and/or angular motion of a scanning mirror 620. The scanning mirror 620 may be configured to rotate, tilt, pivot, or move in an angular manner about one or more axes. The scanning mirror 620 can be the same as the scan plate as described elsewhere herein. Any suitable sensors (e.g., position sensitive detector) can be used to detect the motion or angular position of the mirror. For example, piezo-resistive, photodetector, optical position sensor (OPS) or other sensors can be used to sense the motion or angle position. In some embodiments, the position sensor may be a positional sensitive detector (PSD).

In some situations, the positional signal can also be used by the emitting module to control the light source. For example, the positional signals may be used by the emitting module to coordinate light pulses and the motion of the scanning mirror. This provides advantages of providing a triggering signal utilized by both the light source controller and scanner controller without introducing additional components to the Lidar system.

In the illustrated example, the position sensor 610 may be located to a side 621 of the scanning mirror that is opposite of the side 623 where the output light beams 111 incident on the scanning mirror 620. The position sensor 610 may be an optical position sensor that may not be in direct contact with the scanning mirror 620. In the illustrated example, the position sensor 610 may comprise a light source 612 configured for generating measurement light. The measurement light may incident on the side 621 of the scanning mirror 620, directed back to the positional sensor 610 and captured by the detector component 618. The measurement light can be pulse light or continuous light. In some cases, the side 621 of the scanning mirror that is facing the position sensor 610 may have a reflective surface such that the measurement light can be directed back to the position sensor.

The light source 612 and the detector component 618 may be arranged with an angle such that measurement light emitted by the light source can be captured by an active region of the detector component 618. In some cases, supporting elements 615, 616, 617 may be used to position the light source and the detector component into a predetermined angle with respect to each other and/or with respect to the scanning mirror 620. The light source 612 and/or the detector component 618 may be permanently fixed to such supporting elements or removably coupled to such supporting elements.

The light source 612 can be any suitable light source for generating measurement light. For example, the light source may include laser such as sloid-state laser, gas laser, liquid laser, semiconductor laser, fiber laser, and the like. The detector component 618 may be a position sensitive detector that can measure a position of a light spot in one or two-dimensions on the sensor surface. Based on the position of the light spot, the angle of the scanning mirror can be calculated. The angular position may be measured with an angular resolution of no more than 0.01 degree, 0.05 degree, 0.1 degree, or any value below 0.01 degree or above 0.1 degree.

In some cases, the position sensor 610 may include other components such as optical filter 614 or connecting board 619 to enhance the measurement signal or provide electrical connectivity and various other functionalities.

As described above, the fast scan may operate at a relatively high scan rate while the slow scan operates at a scan rate equal to the video frame rate. In some applications, the fast scan operates resonantly while the slow scan provides a substantially sawtooth pattern, scanning progressively down the frame for a (large) portion of the frame time and then flying back to the top of the frame to start over or scanning backward from bottom to top in a continuous fashion. In other applications, interleaved sawtooth scanning, triangular wave scanning, sinusoidal scanning and other waveforms may be used to drive one or both axes. The drive signal may be a composite signal comprising multiple components or individual waveforms.

Figure 7:
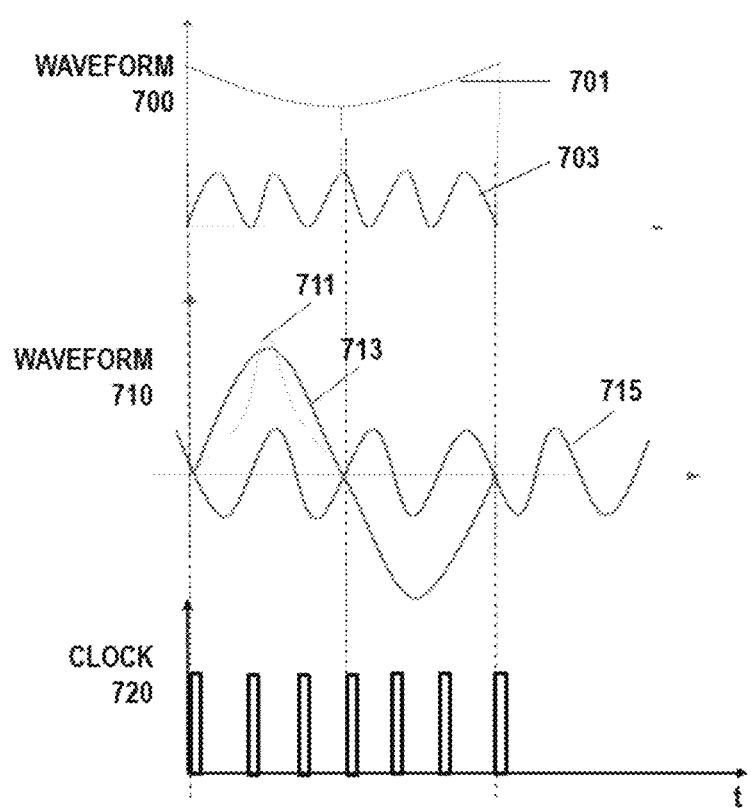
FIG. 7 shows examples of waveforms for driving a scanning mirror, in accordance with some embodiments of the invention.

One or more components of the drive signal can be synchronized by a clock signal or combined with a fixed phase relationship with aid of the clock signal. FIG. 7 shows examples of waveforms for driving a scanning mirror. As shown in the example 700, the drive signals for producing the rotational movements about the fast scan axis and slow scan axis may be synchronized by clock signals 720. The clock signals 720 can be at the same frequency of the fast scan as described above or at a pre-determined times n (n=2, 3, 4, 5, 6, 7, 8, 9, 10, etc) of the fast scan frequency. The clock signal can be pulsed signals, digital signals, continuous signals or any other form. As shown in the example 700, the slow scan waveform 701 may start in response to a clock signal 720 which is produced when the fast scan sweep reaches a start/end.

In some cases, drive signals for actuating many of the embodiments according to the invention may involve combinations of waveforms. For example, waveform 703 is a high frequency signal/component for driving a first oscillation movement about a first axis at a corresponding high resonant frequency. The waveform 703 in this case may be the drive frequency component for the fast scan. Waveform 701 is a lower frequency signal for driving a second oscillation movement about a second axis at a corresponding lower (resonant) frequency. The waveform 701 in this case may be the drive frequency component for the slow scan. The slow scan waveform 701 and the fast scan waveform 703 may be composite frequency components of the drive signals supplied to the scanning mirror.

In some cases, distribution of pixels along the vertical direction (vertical resolution) or slow scan direction may be controlled by varying the drive signals for the slow scan motion. As shown in the example 710, a waveform 710 for driving an oscillation movement about the slow scan axis may be a composite signal 711 comprising a low frequency component 713 and a high frequency component 715. The two components may be combined with a pre-determined phase relationship such that the superimposed signal 711 may drive the scan plate to rotate with increased/reduced speed in selected time intervals (within a vertical scan cycle) thereby reducing/increasing pixel densities in the selected regions. The two components may be synchronized or combined with a fixed phase relationship with aid of the clock signal 720.

Figure 8:
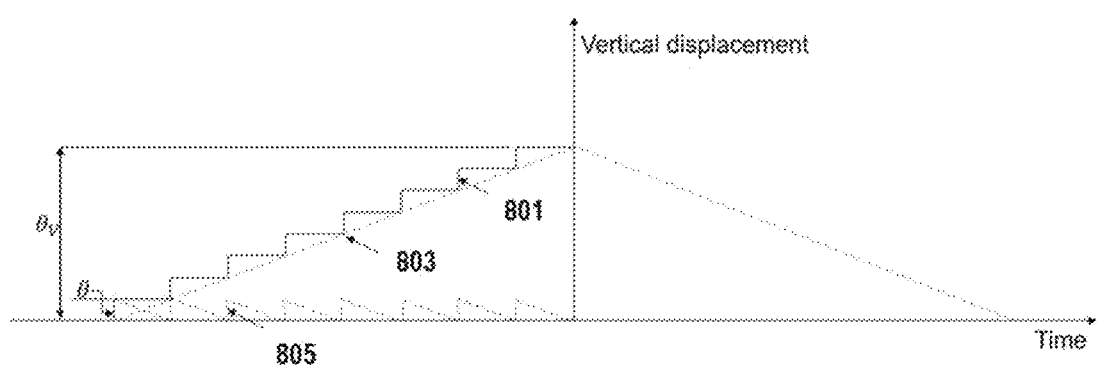
FIG. 8 shows an example of a waveform for driving a scanning mirror with raster pinch correction, in accordance with some embodiments of the invention.

FIG. 8 shows an example of waveform 801 for driving a scanning mirror with raster pinch correction. The waveform for actuating the slow scan motion may be a ramped waveform. A path followed by the scanned beam or series of light pulses in response to a ramped vertical scan may approximate a raster pattern. The waveform for driving an oscillation movement about the slow scan axis may be a composite signal 801 comprising a low frequency component 803 and a high frequency component 805. The low frequency component 803 may be resonant signals which is superimposed with an off resonance frequency signal such as an approximately sawtooth waveform 805. The low frequency component 803 may or may not be at or near the resonant frequency about the slow scan axis. In some cases, the low frequency component may be at the resonant frequency in order to achieve a greater range of deflection angle. Alternatively, the low frequency component may be off resonant frequency so as to avoid frequency drift during operation. The high frequency component 805 may approximate a sawtooth waveform and may be twice of the resonant frequency of the fast scan axis. The high frequency component 805 may be useful for driving the scan plate to rotate at the resonant frequency twice that of the fast scan with the phase synchronized by the clock signal. By combining a high frequency component that twice of the fast scanning motion with a low frequency component and synchronizing them with aid of the clock signal, the scanning mirror may deflect light pulses comprising substantially parallel paths in both left-to-right and right-to-left scanning directions, substantially eliminating raster pinch distortion.

Figure 9:
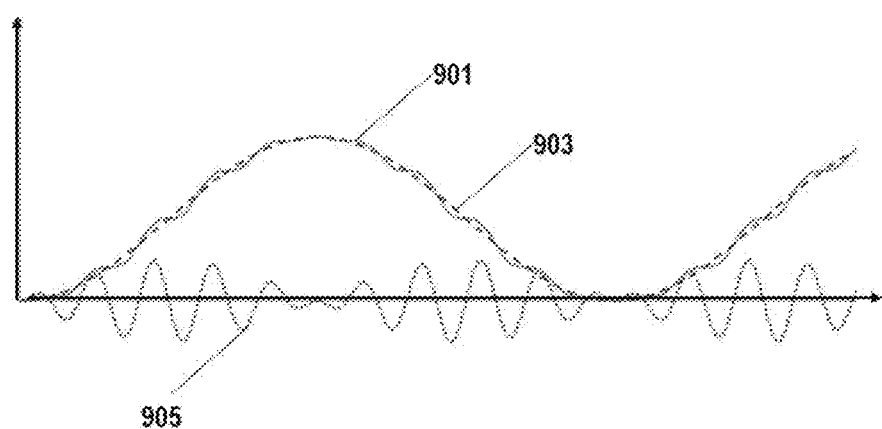
FIG. 9 shows another example of composite drive signals exemplified by individual waveforms, in accordance with some embodiments of the invention.

FIG. 9 shows another example of a composite drive signal 901 exemplified by individual waveforms 903, 905. As shown in the example, a waveform for driving an oscillation movement about the slow scan axis may be a composite signal 901 comprising a low frequency component 903 and a high frequency component 905. The two components may be combined with a pre-determined phase relationship such that the superimposed signal 901 may drive the scan plate to move with increased/reduced speed in selected time intervals (within a vertical sweep) thereby reducing/increasing pixel densities in the selected regions. In some cases, the high frequency component may have varied amplitude such that the waveform/amplitude of the combined signal can be adjusted at a fine-grained controlled level. It should be noted that the high frequency component 905 may have any arbitrary waveform as long as the resultant composite signal 901 can have desired waveform for slowing or accelerating the speed in the vertical direction.

Figure 10:
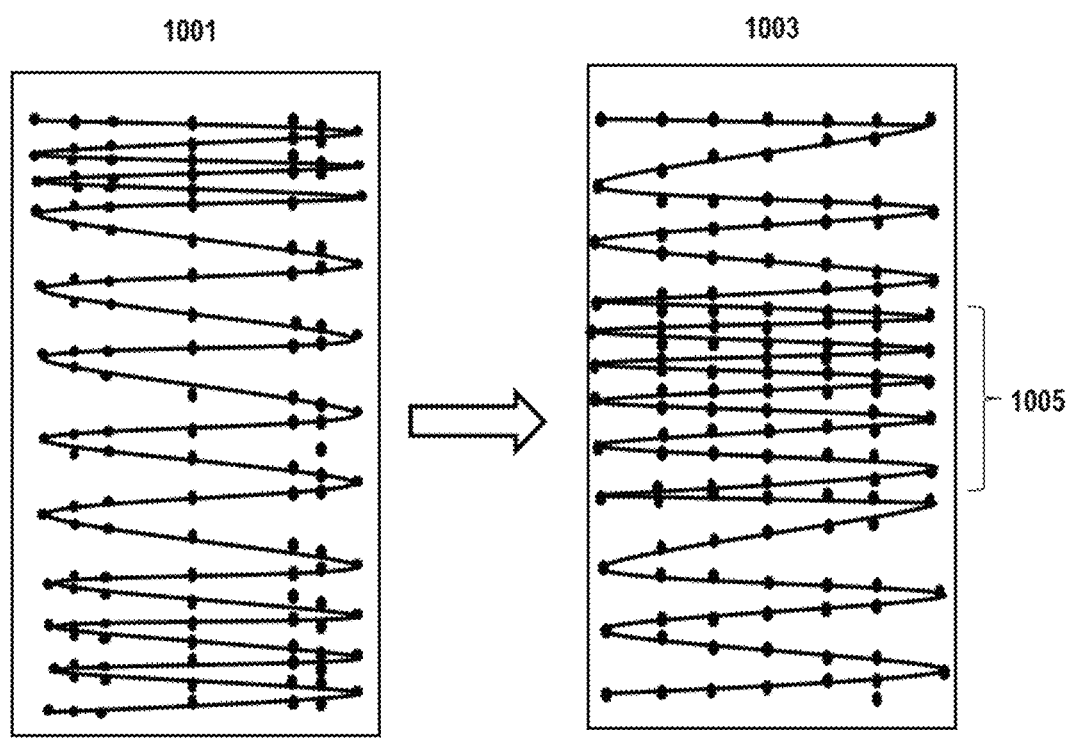
FIG. 10 schematically shows an example of varying a drive signal corresponding to a slow scan motion, in accordance with some embodiments of the invention.

FIG. 10 schematically shows an example of varying the drive signal corresponding to the slow scan motion. Pixels distribution/density along the vertical direction as shown in the scanning pattern 1001 is adjusted in response to the drive signal (e.g., drive signal 901 in FIG. 9) so that vertical resolution is increased in the middle region 1005. This also means that denser measurement pulses are emitted to the middle region 1005 of the field of view. This beneficially allows for an improved efficiency of sampling the environment.

Figure 11:
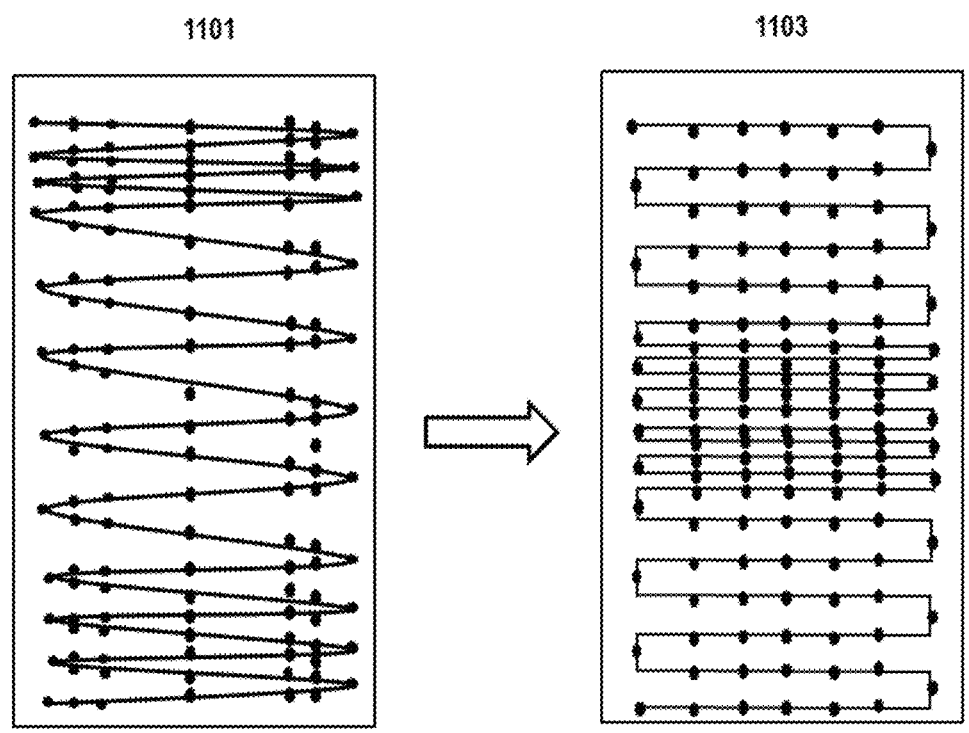
FIG. 11 shows an example of a scanning pattern with configurable distribution of pixels.

It should be noted that the drive signals as described above can be combined in any suitable manner to produce a desired effect. For example, raster pinch correction and pixel distribution variation can be performed simultaneously by combining signal components as described above. FIG. 11 shows an example of a scanning pattern with configurable distribution of measurement points or resolution of pixels. The scanning pattern 1101 may be dynamically adjusted by generating a drive signal to the scanning mirror. The drive signal may comprise multiple signal components with a first component having a resonant frequency of the fast scan for producing a movement about the fast scan axis, a second component having a (resonant) frequency of the slow scan for producing a movement about the slow scan axis, a third component having a frequency twice that of the fast scan frequency for producing a high frequency movement about the slow scan axis (to correct raster pinch distortion), and a fourth component having a frequency and/or waveform for varying the speed of the slow scan motion (to adjust pixel density in selected regions in the vertical direction).

The multiple components may be combined with a fixed phase difference or synchronized with aid of a positional signal as described elsewhere herein. For example, the first component that has a resonant frequency of the fast scan may be synchronized with the second component for actuating the low frequency motion of the slow scan with zero phase difference (i.e., a horizontal sweep reaches its start/ end when the vertical scan is at its start or end). This is also enabled by selecting the resonant frequency and/or oscillation frequency for the oscillation motions in the two directions such that one frequency is a pre-determined times of the other one. Similarly, the first component may also be synchronized with the third component that has a frequency twice of that of the first component for correcting the raster pinch distortion. The fourth component and the second component may have controllable or configurable phase relationship or amplitude relationship such that the slow scan motion of the scanning mirror can be controlled dynamically based on real-time conditions.

In some cases, pixel distribution along the horizontal direction or fast scanning direction may also be adjusted. This may be achieved by controlling the light sources for generating light pulses at desired time intervals. For example, in the case when fiber laser is utilized, the variable time intervals may be achieved by controlling the time intervals of the seed light pulses.

In some situations, non-uniform pixels (points) distribution may be preferred so that dense light spots may be emitted into a selected region in a controllable manner. For instance, light spots may be preferred to be denser in the middle of the line scan or denser in a region where target object is detected and details are desired. This beneficially provides an adjustable resolution over a selected region thereby improving the sampling and computation efficiency of Lidar imaging. As an example, pixel distribution and/or scanning pattern may be adjusted dynamically in response to the detection of a potential target. The scanning pattern or pixel distribution may be determined dynamically based on one or more real-time conditions including an environment condition or a condition of the Lidar system.

Figure 12:
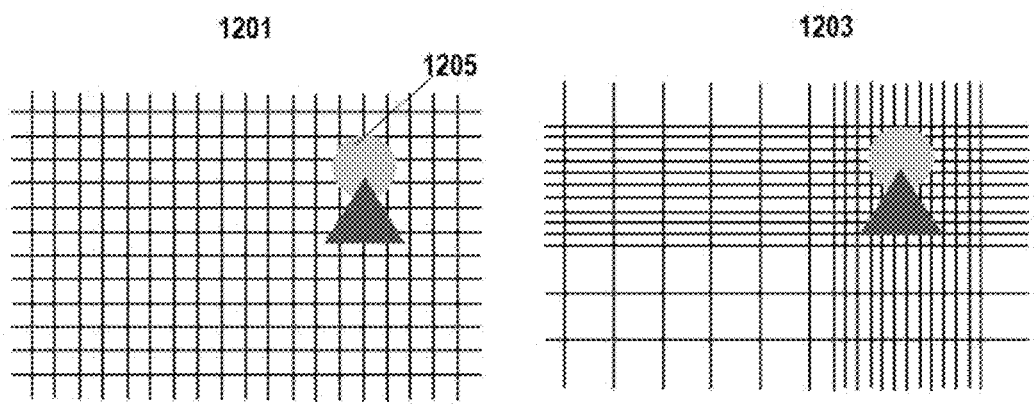
FIG. 12 schematically shows an example of configuring distribution and/or density of pixels/measurement points dynamically in response to real-time conditions.

FIG. 12 schematically shows an example of configuring distribution and density of pixels/measurement points dynamically in response to real-time conditions. In some cases, during a first operation setting 1201, target of interest 1205 may be identified and more information for further identifying may be desired. In response to identifying the location of the target in the field of view, the provided system may adopt a second operation setting 1203 and adjust the drive signal generated to the scanning mirror and the light sources accordingly. The second operation setting may result in higher density of pixels or measurement points allocated to the region of the target of interest.

In some cases, the scanning pattern or pixel distribution may change dynamically to improve energy efficiency of the Lidar system. For example, when the Lidar system is detected to be in a less complex environment (e.g., rural place), a scanning pattern or resolution with fewer pixels allocated towards the edges of the field of view may be selected. This can be achieved by varying the drive signals or one or more components of the drive signals for actuating the slow scan motion and/or adjusting the control signals for the light sources.

Figure 13:
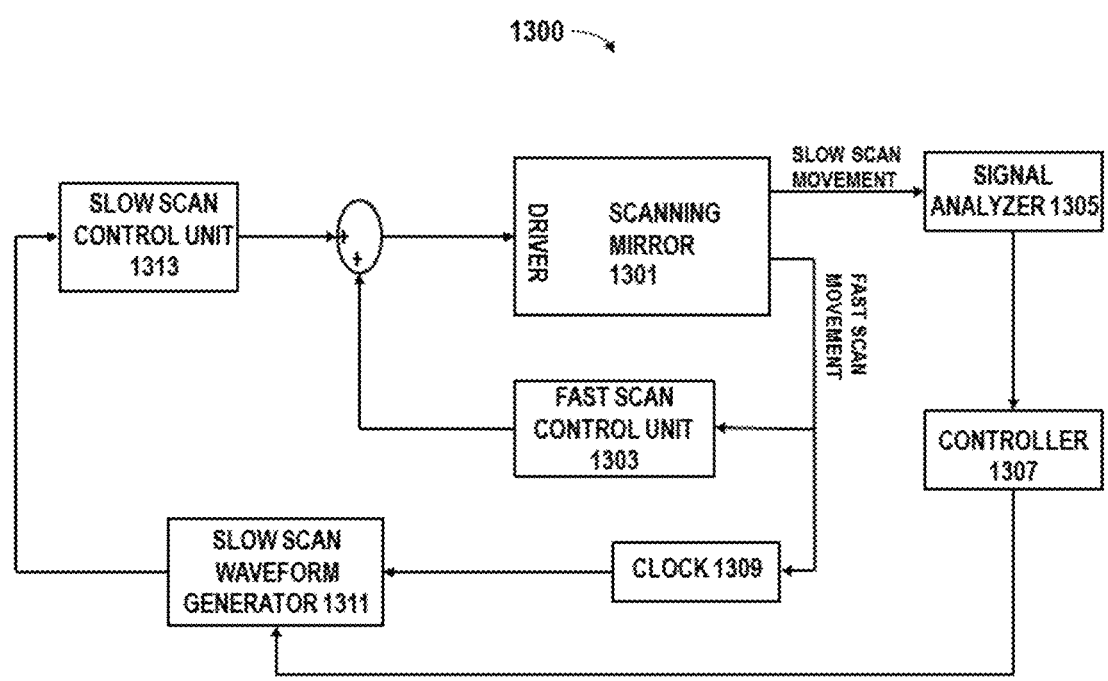
FIG. 13 schematically shows a block diagram of a control system for a scanner, in accordance with some embodiments of the invention.

FIG. 13 schematically shows a block diagram of a control system 1300 for a scanner, in accordance with some embodiments of the invention. The control system 1300 can be the same as the scanner control unit as described in FIG. 1. The scanning mirror 1301 may be controlled by the control system 1300. The scanning mirror can be the same as the scanning mirror as described elsewhere herein. For example, the scanning mirror may include a single multi-axis scanning mirror. In some embodiments, the scanning mirror 1303 may be actuated to rotate about a fast scan axis and a slow scan axis.

The slow scan movement may be detected by a positional sensor. In some cases, the slow scan movement may be analyzed by a signal analyzer 1305. In some cases, the slow scan movement may be ramped vertical scan at a frequency twice that of the resonant frequency about the fast scan axis. The individual waveforms (characteristics of the oscillation motion) associated with the slow scan motion may be extracted by the signal analyzer and fed to the controller 1307 for further adjusting or generating control signals to the slow scan control unit.

In some cases, the controller 1307 may be in communication with a master controller or an external control entity. For example, the controller 1307 may receive instructions from a master controller to adjust the drive signal in order to change the slow scan movement of the scanning mirror. For instance, when a target is detected, the controller 1307 may receive instructions containing information about the location (coordinates) about the target. In response to the instruction, the controller 1307 may generate instructions to the slow scan waveform generator 1311 to generate a waveform or a component waveform of the drive signal for varying the vertical/slow scan motion of the scanning mirror. For instance, a high frequency component or an individual high frequency waveform with varying amplitude may be generated and added to the signal component for actuating the slow scan motion thereby decreasing the moving speed in the target location. The variable high frequency waveform may be combined with the other components with aid of a clock signal produced by the clock 1309.

The individual waveform associated with the slow scan movement may then be transmitted to the slow scan control unit 1313 for generating control signals. A drivel signal component for actuating the slow scan movement may be generated and combined with the drive signal component for actuating the fast scan movement.

The fast scan movement of the scanning mirror 1301 may be monitored and detected by a positional sensor as described above. The fast scan movement may be utilized for generating clock signals for synchronizing the slow scan movement and the fast scan movement as described elsewhere herein. In some embodiments, clock signals may be generated by the clock 1309 and supplied to the slow scan waveform generator 1311 to trigger control signals for the slow scan motion. The clock signals can also be used to synchronize or combine various signal components of the composite drive signal for various purposes as described above.

The fast scan movement may be fed to a fast scan control unit 1303 as feedback information for generating control signals. The fast scan control unit 1303 may dynamically adjust the control signal or generate drive signal for actuating the fast scan movement based on the feedback information.

In some cases, the combined drive signal including the output from the fast scan control unit 1303 and the slow scan control unit 1313 may be transmitted to the driver circuit of the scanning mirror.

The control unit, functions, algorithms, operations, circuits or the methods may be implemented using software, hardware or firmware or a combination thereof. In some embodiments, the control unit may comprise one or more processors and at least one memory for storing program instructions. The processors may be a component of the Lidar system. Alternatively, the processors may be external to the Lidar system but in communication with the Lidar system. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. The control unit may be a standalone device or system that is in communication with the Lidar system. Alternatively, the control unit may be a component of the Lidar system. The methods disclosed herein such as generating variable vertical scan motion in response to real-time condition can be implemented in hardware components or combinations of hardware and software such as, for example, ASICs, special purpose computers, or general purpose computers.

The provided laser control or stabilization method and mechanism can be utilized in conjunction with various Lidar systems or can be used in various applications. For example, when denser light spots are desired in a given region the vertical scan motion may be varied. In such case, the aforementioned methods and mechanism may also provide stabilization and raster pinch correction for the scanner.

A Lidar system equipped with the described scanner control mechanism may be provided on a movable object to sense an environment surrounding the movable object. Alternatively, the Lidar system may be installed on a stationary object.

A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

In some cases, the movable object can be an autonomous vehicle which may be referred to as an autonomous car, driverless car, self-driving car, robotic car, or unmanned vehicle. In some cases, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the Lidar systems may be integrated into a vehicle as part of an autonomous-vehicle driving system. For example, a Lidar system may provide information about the surrounding environment to a driving system of an autonomous vehicle. In an example, the Lidar system may provide a 360 degree horizontal field of view of the vehicle. An autonomous-vehicle driving system may include one or more computing systems that receive information from a Lidar system about the surrounding environment, analyze the received information, and provide control signals to the vehicle's driving systems (e.g., steering wheel, accelerator, brake, or turn signal).

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system for light detection and ranging, comprising:
   a light source configured to emit a plurality of laser beams for determining a distance to an object in a three-dimensional environment;
   a scanner having a plurality of scan axes and configured to direct the plurality of laser beams to the three-dimensional environment;
   a detector configured to output a point cloud image comprising the distance to the object based on echoes of the plurality of laser beams; and
   a controller coupled to the scanner and configured to generate a drive signal to cause the scanner to adjust a resolution for determining the distance in a region in a field of view based on a real-time condition.

2. The system of claim 1, wherein the controller is further configured to cause the scanner to use a first resolution for determining a distance to a first object in a region and use a second resolution lower than the first resolution for determining a distance to a second object in other regions in the field of view.

3. The system of claim 1, wherein the real-time condition comprises detection of a target in the three-dimensional environment.

4. The system of claim 1, wherein the drive signal is configured to drive the scanner to move in an angular manner about at least one of the plurality of scan axes.

5. The system of claim 4, wherein the resolution comprises spatial resolution in a first direction and spatial resolution in a second direction, and the controller is configured to dynamically adjust the resolution by at least one of:
varying a controlled time interval of emitting the plurality of laser beams, or
varying a movement of the scanner about at least one of the plurality of scan axes.

6. The system of claim 4, wherein the drive signal comprises a first component configured to drive the scanner to move in an angular manner about a first axis at a first frequency, and a second component configured to drive the scanner to move in an angular manner about a second axis at a second frequency.

7. The system of claim 6, wherein the first component and the second component are configured to be combined with a pre-determined phase relationship.

8. The system of claim 6, wherein the drive signal further comprises a third component configured to correct raster pinch distortion.

9. The system of claim 6, wherein the drive signal further comprises a fourth component configured to adjust the spatial resolution in the second direction by varying a movement of the scanner about the second axis.

10. A method for controlling a light detection and ranging system, comprising:
controlling a light source to emit a plurality of laser beams for determining a distance to an object in a three-dimensional environment;
actuating a scanner having a plurality of scan axes to direct the plurality of laser beams to the three-dimensional environment;
outputting a point cloud image comprising the distance to the object based on echoes of the plurality of laser beams; and
generating a drive signal to cause the scanner to adjust a resolution for determining the distance in a region in a field of view based on a real-time condition.

11. The method of claim 10, wherein generating a drive signal to cause the scanner to adjust a resolution for determining the distance in a region in a field of view based on a real-time condition comprising:
causing the scanner to use a first resolution for determining a distance to a first object in a region and use a second resolution lower than the first resolution for determining a distance to a second object in other regions in the field of view.

12. The method of claim 10, wherein the real-time condition comprises detection of a target in the three-dimensional environment.

13. The method of claim 10, wherein the drive signal is configured to drive the scanner to move in an angular manner about at least one of the plurality of scan axes.

14. The method of claim 13, wherein the resolution comprises spatial resolution in a first direction and spatial resolution in a second direction, and generating a drive signal to cause the scanner to adjust a resolution for determining the distance in a region in a field of view based on a real-time condition further comprising dynamically adjusting the resolution by at least one of:
varying a controlled time interval of emitting the plurality of laser beams, or
varying a movement of the scanner about at least one of the plurality of scan axes.

15. The system of claim 13, wherein the drive signal comprises a first component configured to drive the scanner to move in an angular manner about a first axis at a first frequency, and a second component configured to drive the scanner to move in an angular manner about a second axis at a second frequency.

16. The system of claim 15, wherein the first component and the second component are configured to be combined with a pre-determined phase relationship.

17. The system of claim 15, wherein the drive signal further comprises a third component configured to correct raster pinch distortion.

18. The system of claim 15, wherein the drive signal further comprises a fourth component configured to adjust the spatial resolution in the second direction by varying a movement of the scanner about the second axis.

* * * * *